(12) United States Patent
Levinton

(10) Patent No.: US 8,107,152 B2
(45) Date of Patent: Jan. 31, 2012

(54) ELECTRO-OPTICAL TUNABLE BIREFRINGENT FILTER

(75) Inventor: Fred M. Levinton, Princeton, NJ (US)

(73) Assignee: Nova Photonics, Princeton, NJ (US)

( * ) Notice: Subject to any disclaimer, the term of this patent is extended or adjusted under 35 U.S.C. 154(b) by 138 days.

(21) Appl. No.: 12/201,614

(22) Filed: Aug. 29, 2008

(65) Prior Publication Data

US 2009/0059343 A1 Mar. 5, 2009

Related U.S. Application Data

(60) Provisional application No. 60/968,715, filed on Aug. 29, 2007.

(51) Int. Cl.
*G02F 1/03* (2006.01)

(52) U.S. Cl. .................................................. 359/252

(58) Field of Classification Search .................. 359/252
See application file for complete search history.

(56) References Cited

U.S. PATENT DOCUMENTS

| | | | | |
|---|---|---|---|---|
| 5,347,378 A * | 9/1994 | Handschy et al. | | 349/78 |
| 5,689,317 A * | 11/1997 | Miller | | 349/97 |
| 5,841,536 A * | 11/1998 | Dimmick | | 356/491 |
| 5,892,612 A * | 4/1999 | Miller et al. | | 359/250 |
| 6,204,901 B1 * | 3/2001 | Knox | | 349/96 |
| 7,196,847 B2 * | 3/2007 | Ye | | 359/501 |
| 7,982,955 B2 | 7/2011 | Miller | | |
| 2008/0007813 A1 * | 1/2008 | Wang et al. | | 359/245 |

* cited by examiner

*Primary Examiner* — Joseph P Martinez

(74) *Attorney, Agent, or Firm* — Fox Rothschild LLP; Richard C. Woodbridge; Perry M. Fonseca

(57) ABSTRACT

An electrically tunable Lyot type filter is a Lyot that include one or more filter elements. Each filter element may have a planar, solid crystal comprised of a material that exhibits birefringence and is electro-optically active. Transparent electrodes may be coated on each face of the crystal. An input linear light polarizer may be located on one side of the crystal and oriented at 45 degrees to the optical axis of the birefringent crystal. An output linear light polarizer may be located on the other side of the crystal and oriented at −45 degrees with respect to the optical axis of the birefringent crystal. When an electric voltage is applied between the electrodes, the retardation of the crystal changes and so does the spectral transmission of the optical filter.

13 Claims, 8 Drawing Sheets

ELECTRO-OPTICAL TUNABLE BIREFRINGENT FILTER

CROSS REFERENCE TO RELATED APPLICATIONS

This application is related to, and claims priority from, U.S. Provisional Patent application Ser. No. 60/968,715 filed on Aug. 29, 2007 by F. Levinton entitled "Electro-optical tunable birefringent filter", the contents of which are hereby incorporated by reference in their entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of DE-FG02-99ER54520 awarded by the U.S. Department of Energy.

FIELD OF THE INVENTION

The present invention relates to tunable optical filters and in particular to narrow bandpass, optical birefringent interference filters that are electro-optically tunable.

BACKGROUND OF THE INVENTION

Optical bandpass filters typically isolate a narrow portion of the wavelength spectrum and have applications in a broad range of technologies, ranging from astronomy to DNA Analyzers to Paint Color Matching Systems. Several types of filters exist, including, but not limited to, Fabry-Perot and birefringent interference filters. The choice of a particular design of filter depends on the application requirements regarding factors such as bandwidth, field-of-view, aperture size, and tuning.

One useful optical bandpass filter is a birefringent interference filter. The birefringent interference filter was apparently invented by Bernard Lyot in 1933 and later independently by Ohman who apparently constructed the first such filter to be used for solar observations.

Birefringent materials have the property that their index of refraction varies along different axis of a crystal or other material. Such materials are said to be anisotropic. The velocity of propagation of light is inversely proportional to the index of refraction, so that light passing along different orientations of the crystal material may travel at different velocities and will typically emerge phase-shifted. The crystal axis having the extraordinary refractive index is sometimes referred to as the Z axis of the birefingement material and sometimes simply as the optical axis of the material.

FIG. 1 is a schematic 3-D view of a birefringent material 11 acting as a half-wave retarder 10. When suitably oriented, the birefringent material 11 may have a first axis 16 having a first refractive index that allows a component of electromagnetic radiation 18 oriented parallel to that axis to travel faster than a component of electromagnetic radiation 14 that is parallel to a second axis 15 having a second refractive index and that is orthogonal to the first axis 16. The total length of the birefringent material 11 may be selected such that a component of electromagnetic radiation 14 parallel to the slow axis may be retarded by half a wavelength with respect to a component of electromagnetic radiation 18 oriented parallel to the fast axis 16. Electromagnetic radiation oriented at +45 degrees 12 with respect to the first axis 16 will, therefore, become oriented at −45 degrees 13 with respect to the first axis 16.

The birefringent material 11 of the appropriate length and crystalline orientation may, therefore, be used as a half wave retardation plate that transforms linear polarized electromagnetic radiation oriented at 45 degrees 12 with respect to the first axis 16 to linear polarized electromagnetic radiation oriented at −45 degrees with respect to the first axis 16.

FIG. 2 is a schematic representation of a half-wave retarder. An input linear polarizer 22 oriented at +45 degrees to the vertical is represented by a double arrow with the angle of orientation underneath. The half-wave retarder 10 is represented by a box with the value of the retardation at the top and the orientation of the fast axis with respect to the vertical at the bottom. An output linear polarizer 20 oriented at −45 degrees to the vertical is represented by a double arrow with the angle of orientation underneath.

FIG. 3 is a graph representing the spectral through put of a typical half-wave retarder 10. The vertical axis 26 represents the amount of light transmitted and the horizontal axis 28 represents the wavelength of the light. The phase shift $\Gamma$ is wavelength dependent and may be represented mathematically as:

$$\Gamma = 2\pi \cdot \Delta n \cdot d / \lambda$$

where $\Delta n$ is the birefringence that is equal to the difference between the ordinary and extraordinary indices of the material being used, i.e., $\Delta n = n_e - n_o$, d is the length of the birefringent material 11, and $\lambda$ is the wavelength of the light.

A wavelength phase shift that is an even integer multiple of $\pi$ will result in maximum transmission through the half-wave retarder 10 of FIGS. 1 and 2, i.e., $\Gamma = 2m\pi$, where m is an integer, results in maximum transmission. A wavelength phase shift that is an odd integer multiple of $\pi$ will result in a minimum transmission through the half-wave retarder 10 of FIGS. 1 and 2, i.e., $\Gamma = (2m+1)\pi$, where m is an integer, results in maximum transmission. The normalized intensity may, therefore, be represented by the mathematical equation:

$$I = \cos^2(\Gamma/2)$$

where $\Gamma$ is the phase shift and at normal incidence as discussed above. This relationship between intensity and wavelength is represented graphically in FIG. 3.

This cyclic variation in transmission may be used to produce a narrow band filter by combining two or more half-wave retarder stages each having a crystal thickness that is twice that of the preceding stage, i.e., the thickness ratios of the stages are 1:2:4:8. In this way, every other maximum in transmission spectrum of the thickest stage may be suppressed by a minimum of the next thinnest stage.

FIG. 4 is a schematic representation of a two stage Lyot optical filter 40. An input linear polarizer 32 may be oriented so as to produce linear polarized light that is oriented vertically. A first stage birefringent element 30 of the two stage Lyot optical filter 40 may have a length that provides a retardation of $2m\pi$ radians, where m is an integer. A second stage birefringent element 36 may be selected to be half the length of the first stage birefringent element 30 and therefore only provide half the retardation, i.e., $m\pi$ radians of retardation. A first linear polarizer 32, a second linear polarizer 34 and a third linear polarizer 38 may be all oriented to allow maximum transmission of vertically oriented polarized light.

FIG. 5 is a graphical representation of the spectral through put the two stage Lyot optical filter of FIG. 4. The spectral throughput of the thinner, second stage birefringent element 36 and the second linear polarizer 34 and the linear polarizer 38 is represented by the dotted line curve 42. The spectral throughput of the thicker, first stage birefringent element 30 is represented by the dotted line curve 44. The combined spectral throughput of all the optical elements of the two stage Lyot optical filter 40 is represented by a solid line curve 46. As the solid line curve 46 indicates, even the two stage Lyot optical filter 40 is capable of isolating a relatively narrow band of electromagnetic radiation.

In order to isolate an even narrower bandwidth of the spectrum, more stages may be added to the filter. A practical problem is that as all stages have to transmit the wavelength being isolated. All the stages, therefore, ought to have a maximum of transmission at that wavelength, else the total transmission through the filter will be impaired. To avoid having to have unduly strict manufacturing tolerances on the optical elements, it is possible to insert elements with a tunable retardation, such as a liquid crystal element, into each stage of the filter, though this has the disadvantage of introducing adding additional elements. Minimizing the number of elements in an optical filter is usually desirable. It would, therefore, be highly advantageous to produce a stage of a Lyot filter that is easily tunable without the need for additional elements.

SUMMARY OF THE INVENTION

Briefly described, the invention provides an electrically tunable optical filter. In a preferred embodiment, the electrically tunable filter is a Lyot type filter that may include one or more filter elements. Each of the filter elements may include a planar, solid crystal comprised of a material that exhibits birefringence and is electro-optically active. Transparent electrodes may be coated on each face of the crystal. An input linear light polarizer may be located on one side of the crystal and oriented at 45 degrees to the optical axis of the birefringent crystal. An output linear light polarizer may be located on the other side of the crystal and oriented at −45 degrees with respect to the optical axis of the birefringent crystal. When an electric voltage is applied between the electrodes, the retardation of the crystal changes and, therefore, so does the spectral transmission of the optical filter.

In a preferred embodiment, the crystal may be a material such as lithium niobate.

These and other features of the invention will be more fully understood by references to the following drawings.

DETAILED DESCRIPTION

The present invention provides an electrically tunable optical filter element that may be incorporated into a Lyot type filter. In a preferred embodiment, the filter elements uses a birefringent, solid crystal material that is also electro-optically active and can therefore be tuned directly by applying a voltage across its faces. Such a filter element may be incorporated into a readily tunable Lyot type filter.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 1:
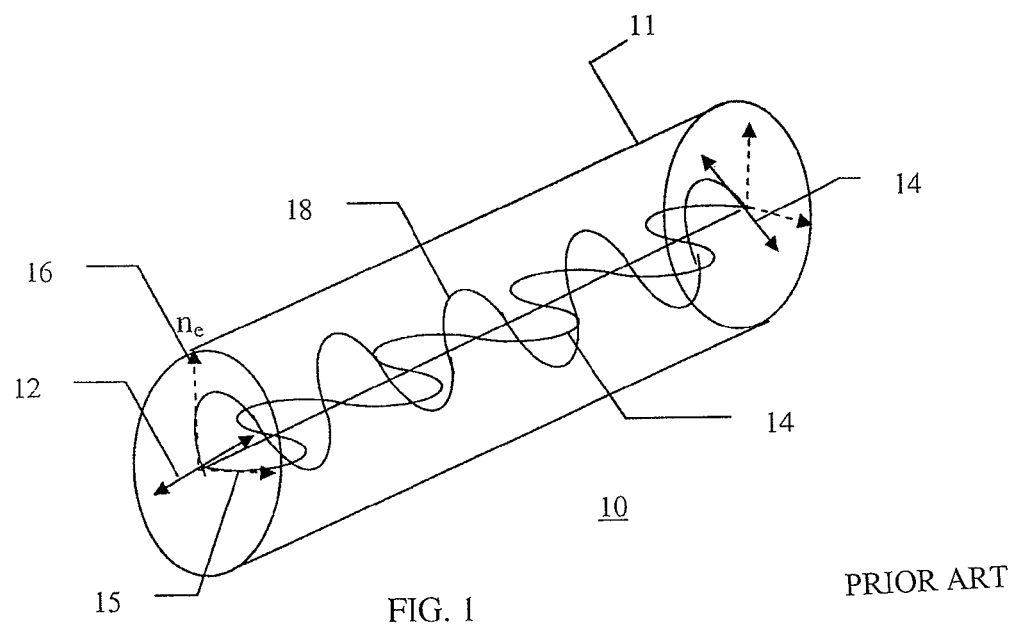
FIG. 1 is a 3-D representation of a birefringent material acting as a half-wave retarder.
Figure 2:
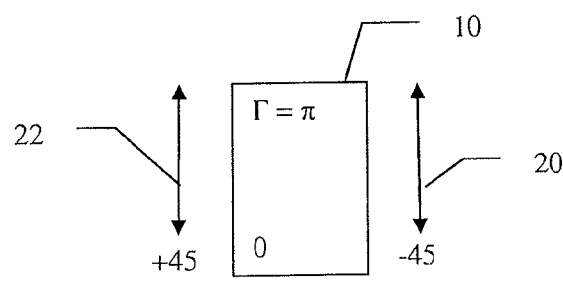
FIG. 2 is a schematic representation of a half-wave retarder.
Figure 3:
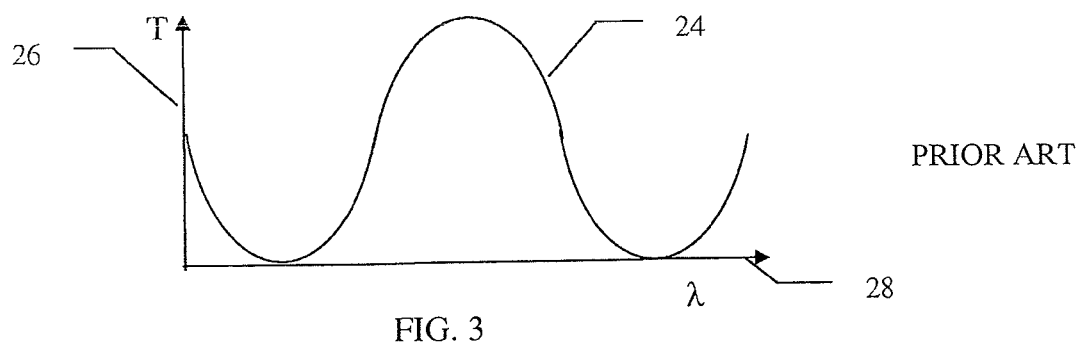
FIG. 3 is a graph representing the spectral throughput of a typical half-wave retarder.
Figure 4:
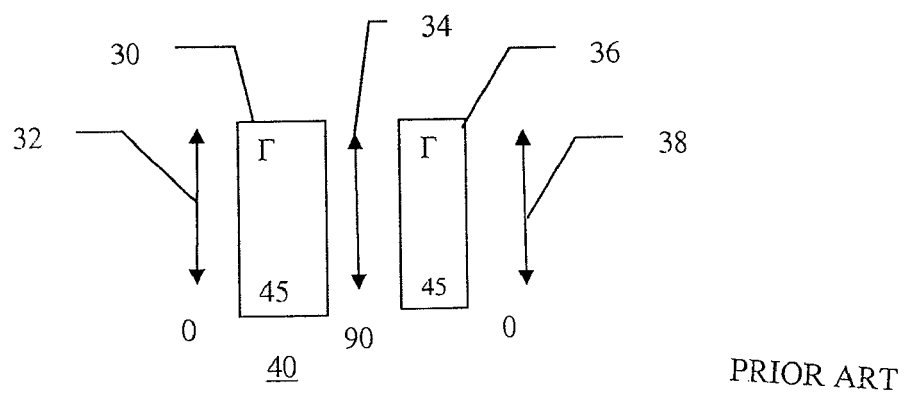
FIG. 4 is a schematic representation of two stage Lyot optical filter.
Figure 5:
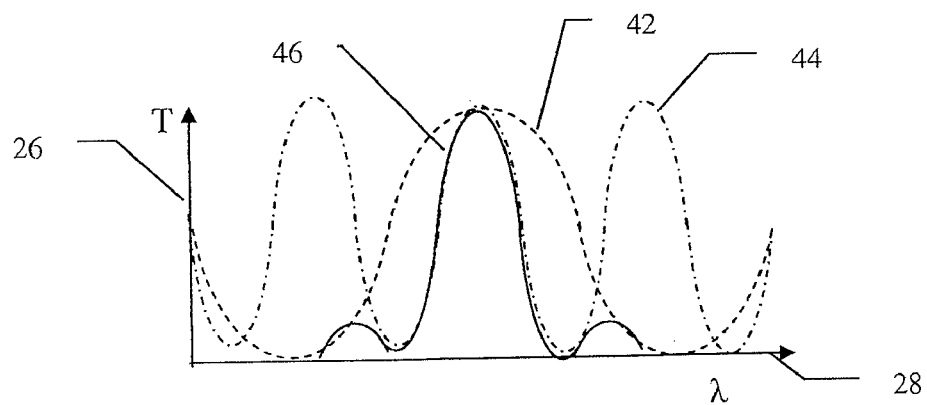
FIG. 5 is a graphical representation of the spectral throughput the two stage Lyot optical filter of FIG. 4.
Figure 6A:
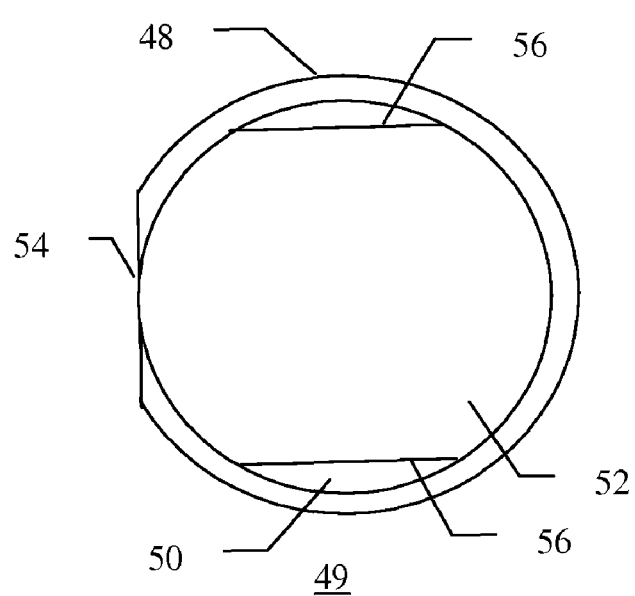
FIG. 6A is a schematic plan view of an exemplary solid, tunable birefingent element.

FIG. 6A is a schematic plan view of an exemplary solid, tunable birefingent element 49. The solid, tunable birefingent element 49 includes a disk of birefringent material 48, transparent electrodes 50 and optional antireflection coatings 52. The disk of birefringent material 48 may have one flat edge 54 that may be used to memorialize the orientation of the optical axis of the disk of birefringent material 48. The antireflection coatings 52 may have gaps 56 to allow electrical connections to be made to the transparent electrodes 50.

Figure 6B:
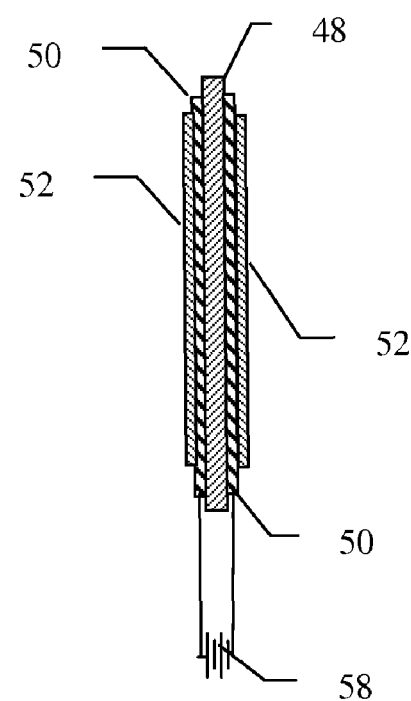
FIG. 6B is a schematic cross-section of an exemplary solid, tunable birefingent element.

FIG. 6B is a schematic cross-section of the exemplary solid, tunable birefingent element 49. A suitable voltage 58 is attached to the two transparent electrodes 50 that are coated on the disk of birefringent material 48. The two transparent electrodes 50 may themselves be coated with antireflection coatings 52 to improve optical throughput of the solid, tunable birefingent element 49.

In a preferred embodiment, the disk of birefringent material 48 may be made from a lithium niobate ($LiNbO_3$) crystal as it is a material that possesses the required birefringence, is highly electo-optic, may possess high material uniformity, has a high transmission of visible light and is relatively easy to machine and fabricate to the required dimensions. Other suitable materials include, \but are not limited to, lithium tantalite ($LiTaO_3$). The LiNbO3 crystal is preferably machined so that the axis of the extraordinary refractive index is oriented parallel to the flat surfaces of the disk of birefringent material 48. The axis of the extraordinary refractive index is sometimes referred to as the Z axis of the crystal. In a preferred embodiment, the transmission of light through the solid, tunable birefingent element 49 is perpendicular to the Z axis. This is in contrast to how LiBNbO3 is typically used in, for instance, a Pockel's cell in which the optical axis of transmission is typically along the Z axis so that there is no birefringence with zero voltage applied.

The disk of birefringent material 48 typically has a thickness in the range of 16 mm to 0.2 mm, and typically has a diameter of 75 mm to 100 mm, though one of ordinary skill in the art will readily appreciate that other dimensions may be used.

The transparent electrodes 50 may, for instance, be made from a thin layer of Indium Tin Oxide (ITO). The ITO layer is typically about 100 nm thick.

As detailed in the attached technical appendix, the suitable voltage 58 may be wavelength dependent. In order for a filter to be fully tunable, each Lyot filter element must be capable of providing a phase shift of $2\pi$. As two solid, tunable birefingent elements 49 may be used in each Lyot filter element, each solid, tunable birefingent element 49 need only introduce a phase shift of $\pi$. The voltage to introduce a phase shift of $\pi$ in LiBNbO3 at a wavelength of 660 nm is about 4.11 kV. At a shorter wavelength of 532 nm it is reduced to about 3 kV. In addition to the change of phase the applied voltage causes a change in the principle axes of about 0.05 degrees.

The transparent electrodes 50 are smaller in diameter than the disk of birefringent material 48. The gap between the edge of the transparent electrodes 50 and the edge of the disk of birefringent material 48 may be used to prevent electrical arching or breakdown, especially when the disk of birefringent material 48 is thin.

Figure 7A:
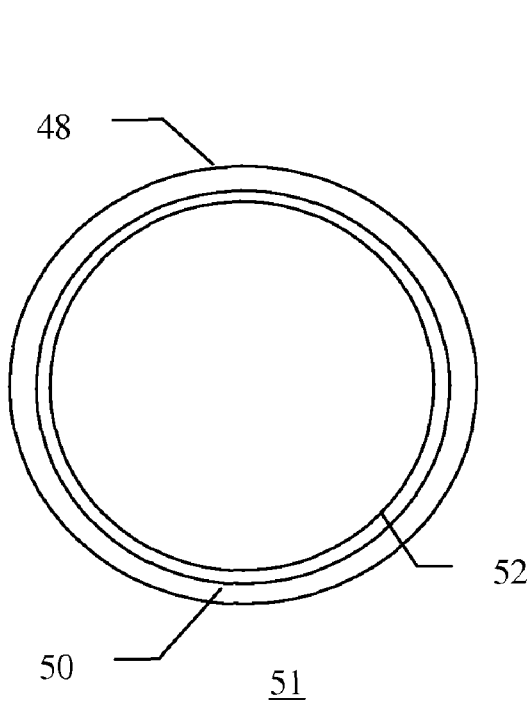
FIG. 7A is a schematic plan view of a further exemplary solid, tunable birefingent element.

FIG. 7A is a schematic plan view of a further exemplary solid, tunable birefingent element. The disk of birefringent material 48, the transparent electrodes 50 and the antireflection coatings 52 may all be applied as disks. Having the antireflection coating 52 disk smaller than the transparent electrodes 50 disk allows a ring of access via which it may be possible to make electrical connections to the transparent electrodes 50. Having the transparent electrodes 50 disk smaller than the disk of birefringent material 48 provides a gap that may help avoid electrical breakdown or arcing between the transparent electrodes 50, especially in the case of thin disks.

Figure 7B:
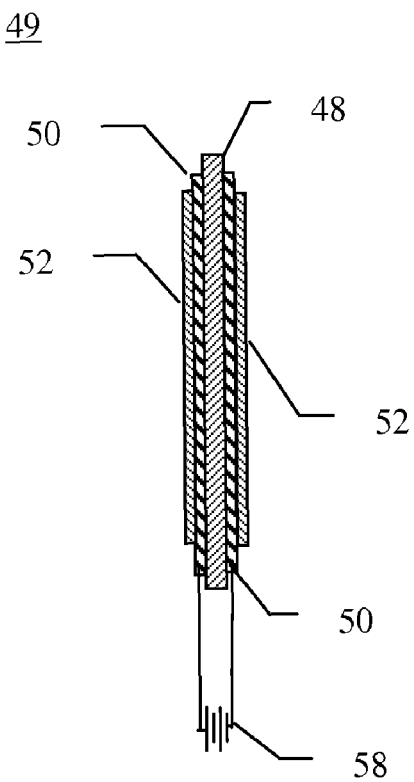
FIG. 7B is a schematic cross-section of a further exemplary solid, tunable birefingent element.

FIG. 7B is a schematic cross-section of a further exemplary solid, tunable birefingent element.

Figure 8:
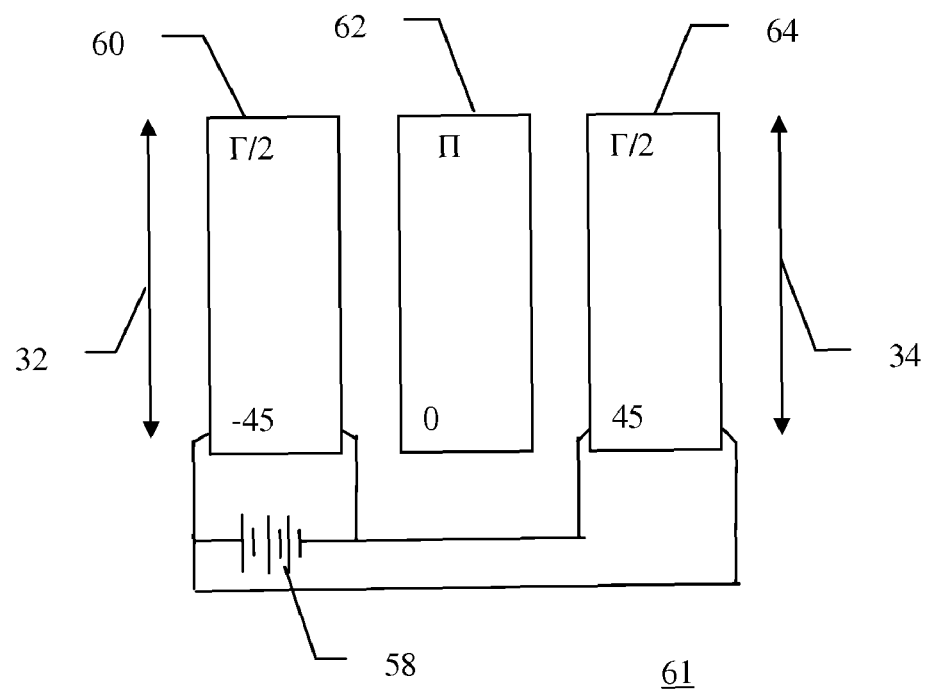
FIG. 8 is a schematic representation of a single stage of a tunable, wide field of view Lyot filter of the present invention.

FIG. 8 is a schematic representation of a single stage of a tunable, wide field of view Lyot filter 61 of the present invention. The tunable, wide field of view Lyot filter 61 may have a first tunable element 60, a half-wave retarder 62, a second tunable element 64, a suitable variable voltage supply 58, a first linear polarizer 32 and a second linear polarizer 34. The first tunable element 60 and the second tunable element 64 may be oriented so their Z crystal axes are 90 degrees apart. The half-wave retarder 62 between them may be oriented with its Z crystal axis at 45 degrees with respect to both of the Z crystal axes of the first tunable element 60 and the second tunable element 64. The suitable variable voltage supply 58 may be connected to the first tunable element 60 and the second tunable element 64 as shown in FIG. 9.

Figure 9:
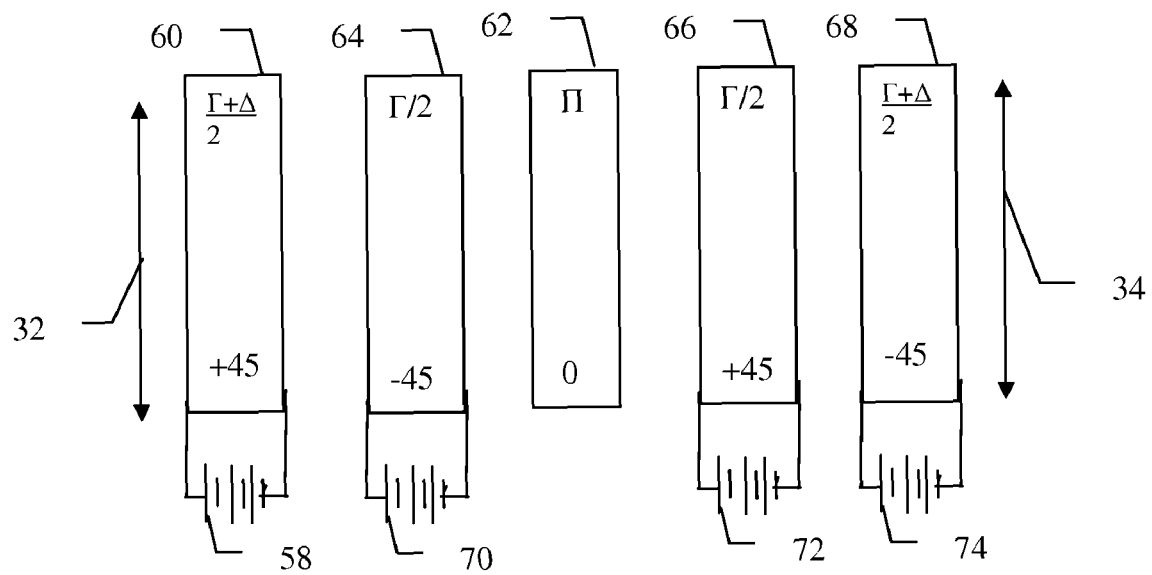
FIG. 9 is a schematic representation of a single stage of a further tunable, wide field of view Lyot filter of the present invention.

FIG. 9 is a schematic representation of a single stage of a further embodiment of a tunable, wide field of view Lyot filter 71 of the present invention. The further tunable, wide field of view Lyot filter 71 may include a first linear polarizer 32, a second linear polarizer 34, a first tunable element 60, a second tunable element 64, a third tunable element 66, a forth tunable element 68, a half-wave retarder 62, a first suitable variable voltage supply 58, a second suitable variable voltage supply 70, a third suitable variable voltage supply 72 and a forth suitable variable voltage supply 74.

The first tunable element 60 is oriented with its Z crystal axis at 90 degrees with respect to the second tunable element 64 and at 45 degrees with respect to the first linear polarizer 32. The first tunable element 60 has a thickness that is slightly more than the second tunable element 64 so that they have a zero-voltage retardation of $(\Gamma+\Delta)/2$ and $\Gamma/2$ respectively. Replacing a single crystal with a pair of crystals that are have their Z crystal axes oriented at 90 degrees to each other, but with a small difference in thickness, results in most of the retardation canceling out, leaving only a residual retardation due to the small difference in thickness. The result is an effective retardation as if the crystals were the thickness of the difference between the two crystals. By independently controlling the voltage on each crystal by the first suitable variable voltage supply 58 and the second suitable variable voltage supply 70, this configuration may be made tunable. In addition the voltage from crystal-to-crystal may be varied to fine tune the retardation and may correct for any errors in crystal thickness introduced during fabrication. A further advantage of such a configuration is that the peak voltages required for tuning may be only ¼ of that required by a single crystal tunable Lyot filter stage.

Similarly, the forth tunable element 68 is oriented with its Z crystal axis at 90 degrees with respect to the third tunable element 66. The forth tunable element 68 has a thickness that is slightly more than the third tunable element 66 so that they too have a zero voltage retardation of $(\Gamma+\Delta)/2$ and $\Gamma/2$ respectively. By independently controlling the voltage on each crystal by the third suitable variable voltage supply 72 and the forth suitable variable voltage supply 74, this configuration may also be made tunable.

Figure 10:
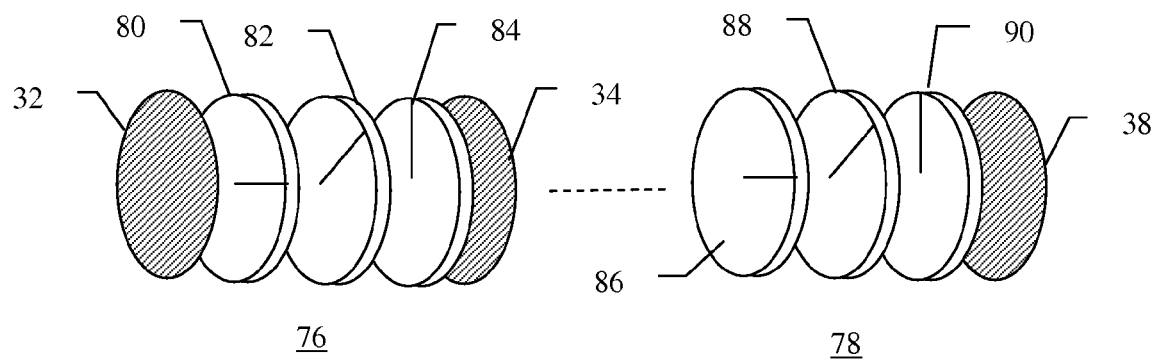
FIG. 10 is a schematic, 3-D representation of two stages of a Lyot filter.

FIG. 10 is a schematic, 3-D representation of two stages of a Lyot filter.

A first Lyot filter stage 76 includes a first linear polarizer 32, a first birefringent element 80 with its Z crystal axis oriented at 0 degrees, a half-wave plate 82 with its Z crystal axis oriented at 45 degrees, a second birefringent element 84 with its Z crystal axis oriented at 90 degrees and a second linear polarizer 34. The second linear polarizer 34 also acts as the input stage to a next Lyot filter stage 78.

The next Lyot filter stage 78 also includes a first birefringent element 86 with its Z crystal axis oriented at 0 degrees, a half-wave plate 88 with its Z crystal axis oriented at 45 degrees, a second birefringent element 84 with its Z crystal axis oriented at 90 degrees and an output linear polarizer 38 with its Z crystal axis oriented at 45 degrees.

The thickness of the birefringent elements in each next stage of the Lyot filter is, however, double the thickness of the birefringent elements in the proceeding stage. If each Lyot filter element is made tunable using techniques such as those discussed above, the entire Lyot filter may be made tunable.

Figure 11:
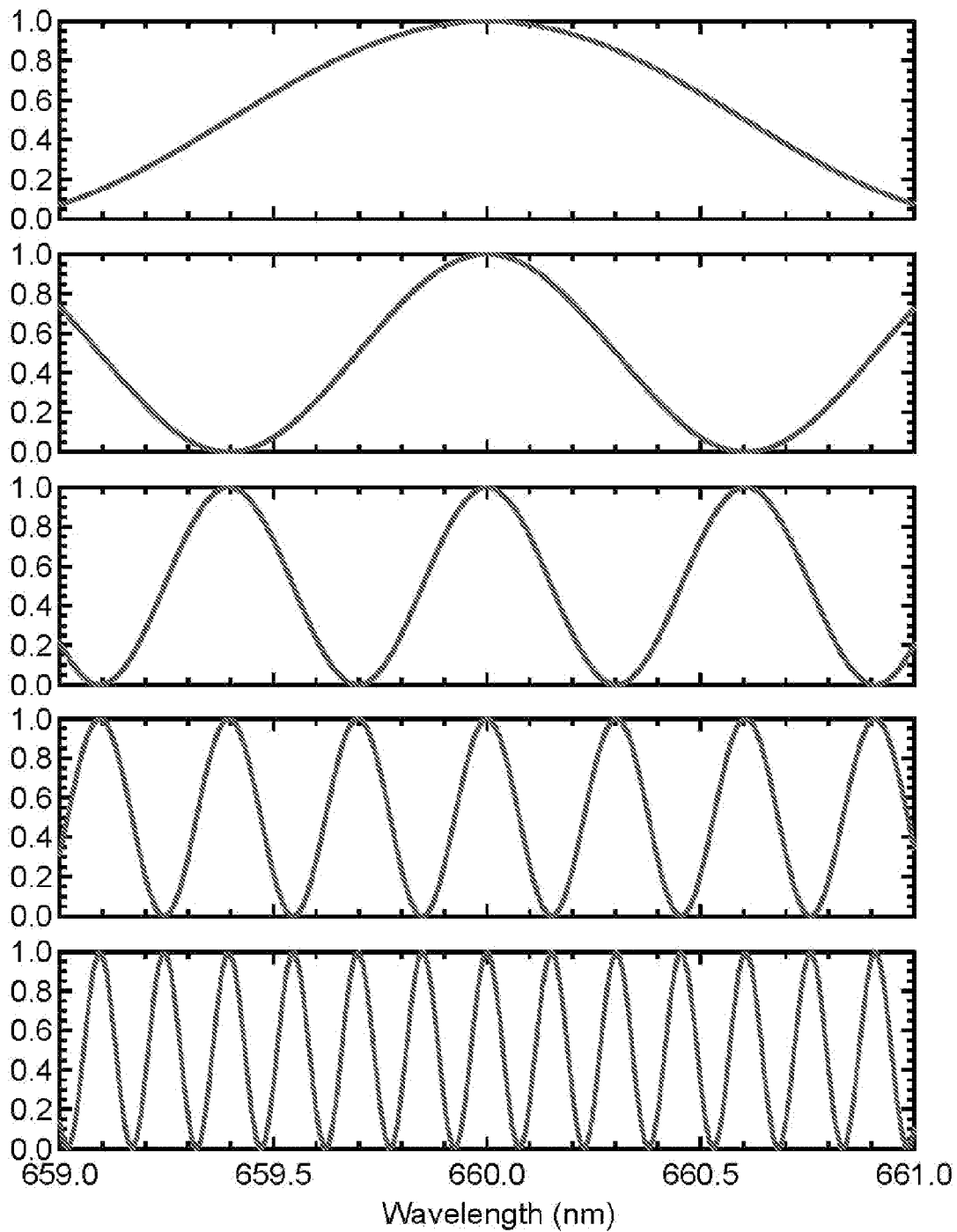
FIG. 11 is a graphical representation of each stage of an exemplary 5 stage Lyot filter.

FIG. 11 is a graphical representation of each stage of an exemplary 5 stage Lyot filter. The top graph shows the optical transmission of the stage having the thinnest birefringent elements. Each successive stage has a birefringent element that is double the thickness of the previous element, and therefore, an optical transmission that has one peak centered on the central transmission peak of the previous stage, but with half the periodicity, so that each other transmission peak occurs at a transmission minimum of a preceding stage. The bottom most graph shows the optical transmission of the stage having the thickest birefringent elements.

Figure 12:
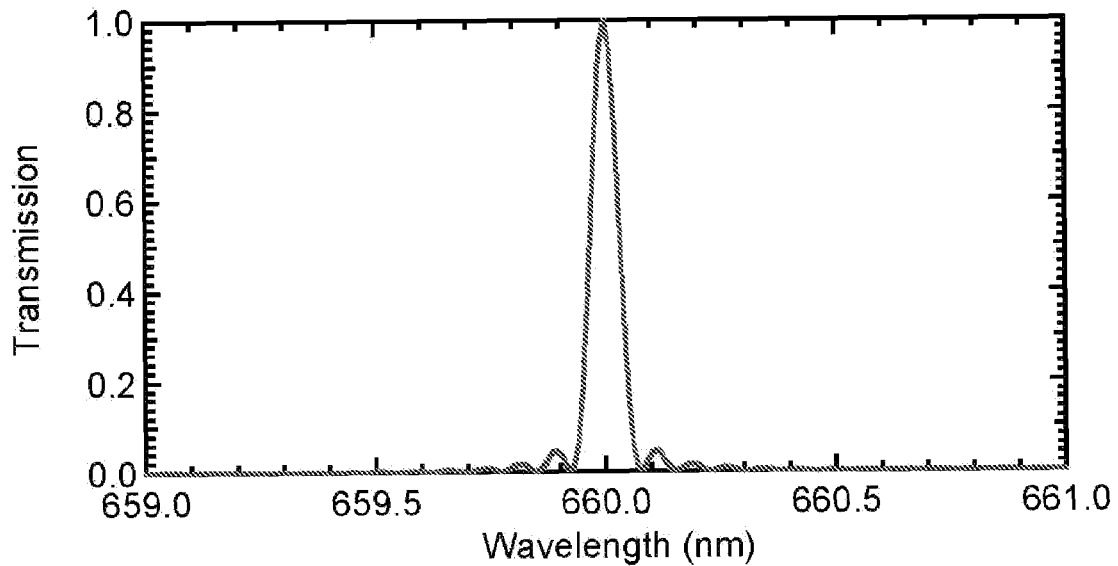
FIG. 12 is a graphical representation of the combined effect of all stages of an exemplary 5 stage Lyot filter.

FIG. 12 is a graphical representation of the combined effect of all stages of an exemplary 5 stage Lyot filter. Only light of the same wavelength that is transmitted through all the stages of the filter, is transmitted through the entire filter.

Figure 13:
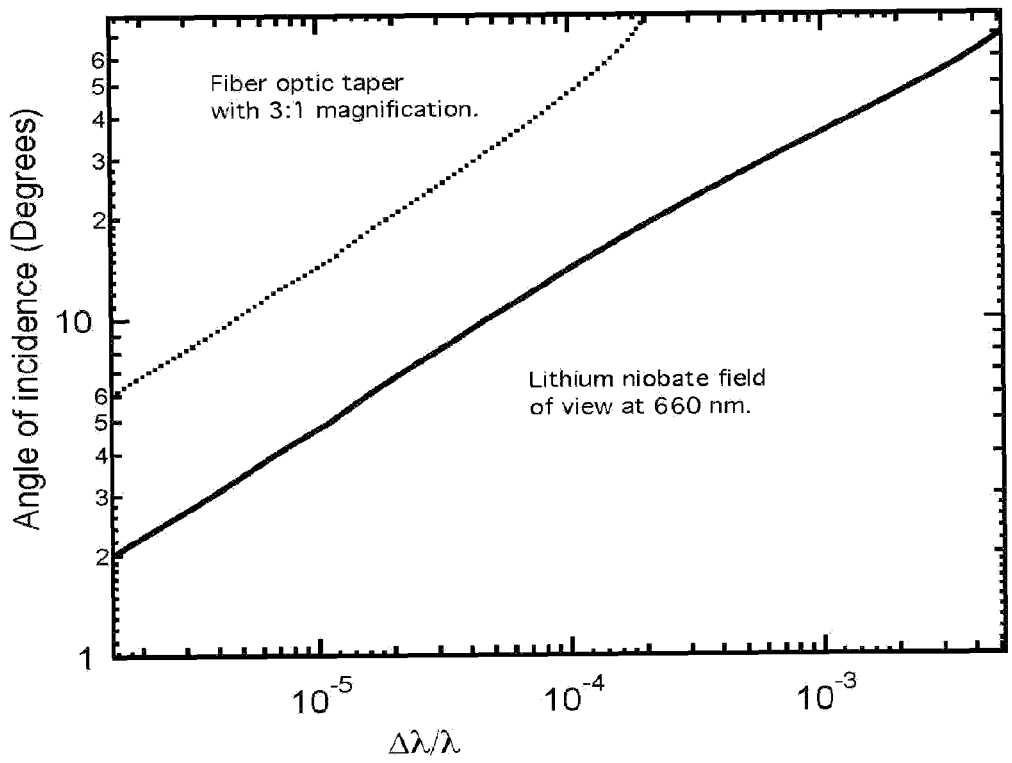
FIG. 13 is a graphical representation showing how the field of view of a Lyot filter is related to the bandwidth of the filter.

FIG. 13 is a graphical representation showing how the field of view of a Lyot filter is related to the bandwidth of the filter.

The solid line on the graph represents the maximum acceptance angle of a Lyot filter made from lithium niobate designed to operate at 660 nm as a function of the bandwidth of the filter. The bandwith may be expressed as the resolution, $\Delta\lambda/\lambda$, i.e., the bandwidth of the light transmitted by the filter divided by the maximum transmission wavelength of the filter.

The dotted line on the graph represents the maximum acceptance angle of the same Lyot filter having a fiber optic taper as an input optic.

Figure 14:
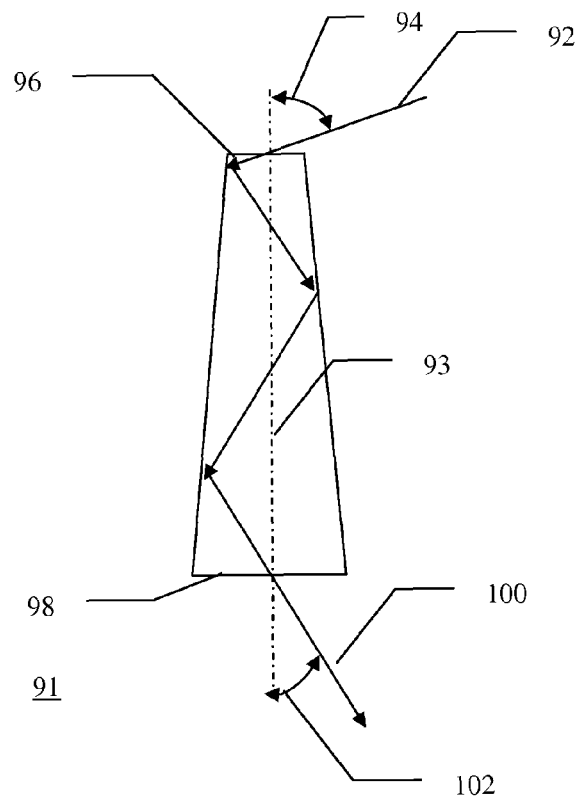
FIG. 14 is a schematic view of a single tapered optical fiber.

FIG. 14 is a schematic view of a single tapered optical fiber 91. An incoming ray 92 enters a narrow end of the fiber 96 at a first angle 94 with respect to an optical axis 93 of the tapered optical fiber 91. After being reflected off the sides of the tapered optical fiber 91, an exit ray 100 emerges from a wider end of the fiber 98 at a second angle 102 with respect to the incoming ray 92 that is smaller than the first angle 94.

Figure 15:
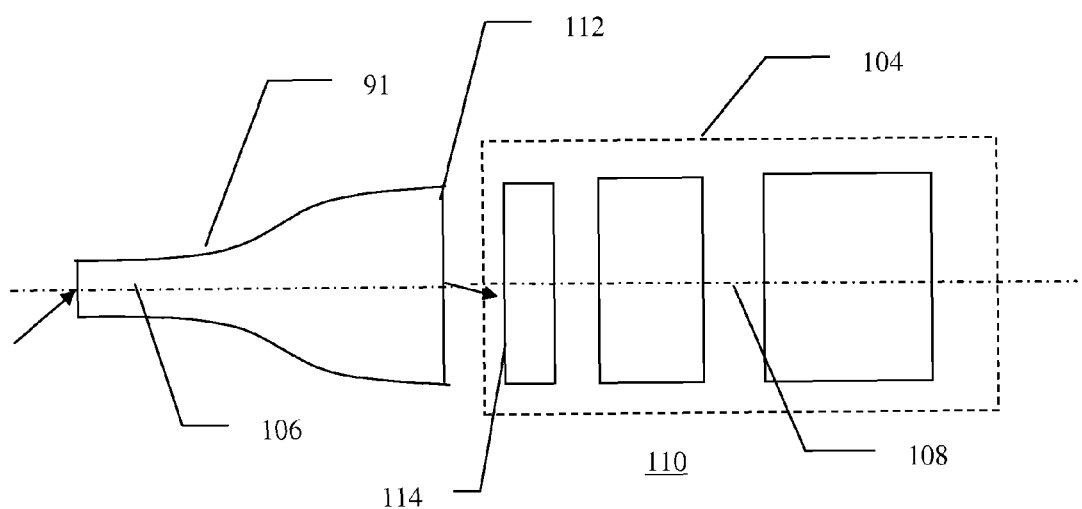
FIG. 15 is a schematic view of fiber optic taper used to enlarge the acceptance angle of a three stage Lyot filter.

FIG. 15 is a schematic view of a fiber optic taper 95 used to enlarge the acceptance angle of a three stage Lyot filter 104. The fiber optic taper 95 may be composed of a bundle of tapered optical fibers 91. The fiber optic taper 95 has a fiber optic taper optical axis 106. In a preferred embodiment, the fiber optic taper optical axis 106 is aligned substantially parallel to a filter optical axis 108 of the three stage Lyot filter 104. In a further preferred embodiment, the fiber optic taper optical axis 106 may be substantially collinear with the filter optical axis 108.

In a preferred embodiment of the wide angle filter 110, designed to increase the acceptance angle of the three stage Lyot filter 104, the fiber optic taper 95 has a larger end hub 112 that is positioned substantially confronting a first or input element 114 of the three stage Lyot filter 104.

One of ordinary skill will realize that although described above with respect to a three stage Lyot filter 104, the principle of the wide angle filter 110 described above could be applied to a filter of any number of stages.

One of ordinary skill will realize that, for applications with other acceptance angle input and/or output requirements, other configurations of the fiber optic taper 95 and the three stage Lyot filter 104 could be used.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

Technical Appexdix

The principle of operation of a Lyot filter is based on the interference of light that is created by a phase delay in a birefringent crystal. Light entering the filter is typically split by a linear polarizer into two equal parts, along the fast and slow axis of a birefringent crystal. This may be done with a linear polarizer oriented at 45° with respect to the crystal axis. Birefringence causes a difference in propagation velocity of light along the two axis of the crystal due to the different indices of refraction resulting in a phase shift between the polarized components. The phase shift is typically determined by the birefringence properties of the material and the thickness of the crystal or birefringent material. The light may be recombined by a second polarizer oriented parallel or perpendicular to the first polarizer. The light intensity may be modulated by the phase shift as it varies from maximum for a $2n\pi$ phase shift to a minimum for a phase shift of $(2n+1)\pi$ where n is an integer. The normalized intensity may be represented by the following mathematical expression:, $$I = \cos^2\left(\frac{\Gamma}{2}\right)$$

where $\Gamma$ is the phase shift and at normal incidence may be represented as:

$$\Gamma = \frac{2\pi}{\lambda}\Delta nd.$$

The birefringence may be represented as $\Delta n = n_e - n_o$, where $n_o$ and $n_e$ is the ordinary and extraordinary indices of refraction, d is the thickness, and $\lambda$ is the wavelength. In the design of a particular type of filter, sometimes known as a Lyot-Öhman filter, a number of such filter stages, consisting of a pair of polarizers and a birefringent crystal element, are combined in series. The crystal thicknesses are typically in a ratio of 1:2:4:8 . . . so that every other peak or maximum wavelength in the spectrum transmitted by the thickest stage will be suppressed by a minimum of the next thinnest stage. With such an arrangement it may be possible to isolate a very narrow bandwidth part of the light spectrum. Furthermore, it is typically necessary that at the wavelength to be transmitted by the filter, all the stages have a maximum of transmission. This is usually ensured by incorporating a tunable element in each stage of the filter. This can also provide some tuning capability of the filter which can be very desirable in some applications.

It is usually advantageous to minimize the number of optical elements in the filter to obtain both the highest possible transmission and the minimum overall length for maximum field-of-view. This can be done using a crystal possessing both a high birefringence and non-zero linear electro-optic coefficients, as found in several crystal $\bar{p}$oint groups such as, 3 m, 6 mm, 42 m, or 4 mm. The application of an electric field normal to the face of the crystal element may cause the birefringence to change, thus changing the retardation and passband of the filter.

A simple Lyot filter is limited in the angle of incidence of the input rays that enter the filter. An improvement over the simple Lyot filter is the split-element configuration providing a wider field-of-view. The crystal is divided into two parts, and oriented such that their crystal axes are 90° apart. A half-wave retarder may be inserted in between the two crystals and oriented at 45° with respect to the crystal axis. This configuration has the additional advantage of requiring only half the operating voltage compared to the simple Lyot filter.

In some applications of optical filters it may be desirable to have a wider bandpass and a large tuning range, often a wavelength range that covers the entire visible spectrum. In order to increase the bandwidth, the retardation should be decreased by reducing the thickness of the crystal. A problem is that a electro-optic crystals described above have a moderately high birefringence that may require the thickness of the crystal to become too thin to be easily fabricated or handled. This invention provides a means to overcome these difficulties. If each crystal in a wide field or simple Lyot filter is replaced with a pair of crystals that have a small difference in thickness and are oriented at 90° with respect to one another, then the retardation of each crystal tends to cancel the other, leaving only the residual retardation due to the small difference in thickness. This will provide an effective retardation as if the crystal were the thickness of the difference between the two crystals. A wide field-of-view filter can be made by using two pairs as described in the previous paragraph. By independently controlling the voltage on each crystal this configuration is made tunable. In addition, the voltage from crystal-to-crystal can be varied to fine tune the retardation and correct for any errors in the crystal thickness that arise in fabrication. Another advantage is the peak voltages are only ¼ of that required by a simple Lyot filter.

An improvement to enhance the field-of-view of the Lyot filter is the addition of an imaging fiber optic taper to the front end of the filter. The fiber optic taper consists of fibers that increase in diameter as the light propagates through it. It also reduces the angle of incidence of light between the input and the output ends that depends on the change in diameter ($d_{in}/d_{out}$) of the fiber and is given by: $\sin(\theta_{out})=(d_{in}/d_{out})\sin(\theta_{in})$, where $\theta_{in}(\theta_{out})$ is the input (output) angle of light, and $d_{in}(d_{out})$ is the input (output) fiber optic diameter. By bonding a number of small diameter fibers together an imaging fiber can be constructed.

The characteristics required of a material for an electro-optically tunable birefringent filter are considerable. It is required to have moderate birefringence, high electro-optic coefficients, large size, high material uniformity, high transmission in the visible, and ease of fabrication. Lithium niobate ($LiNbO_3$) is a suitable material for use in such an element because of its higher birefringence, ease of polishing, non-hygroscopic properties, availability, good transmission, and high electro-optic coefficients. Other materials, such as lithium tantalite ($LiTaO_3$), may, however, also be used.

To determine the electro-optic characteristics of the filter, the contracted indicial equation of the index ellipsoid in the presence of an electric field may be written as:

$$\left(\frac{1}{n_z^2}+r_{1k}E_k\right)x^2+\left(\frac{1}{n_y^2}+r_{2k}E_k\right)y^2+\left(\frac{1}{n_z^2}+r_{3k}E_k\right)z^2+2yzr_{4k}E_k+2zxr_{5k}E_k+2xyr_{6k}E_k=1$$

where $E_k$ is a component of the applied electric field and summation over repeated indices k is assumed. A new principal axis of the ellipsoid may be found that, in general, does not coincide with the unperturbed axes. The new set of principal axes may depend on the crystal symmetry, electric field orientation, and electro-optic coefficients. For lithium niobate, the electro-optic coefficients are typically displayed in the form $$r_{ij}=\begin{pmatrix}0 & -r_{22} & r_{13}\\ 0 & r_{22} & r_{13}\\ 0 & 0 & r_{33}\\ 0 & r_{51} & 0\\ r_{51} & 0 & 0\\ -r_{22} & 0 & 0\end{pmatrix}$$

and the equation for the index ellipsoid may be written as $$\left(\frac{1}{n_o^2}+r_{13}E_z-r_{22}E_y\right)x^2+\left(\frac{1}{n_o^2}+r_{22}E_y+r_{13}E_z\right)y^2+\left(\frac{1}{n_o^2}+r_{33}E_z\right)z^2+2yzr_{51}E_y+2zxr_{51}E_x-2xyr_{22}E_x=1.$$

With the electric field along the y-axis, the index ellipsoid equation may become $$\left(\frac{1}{n_o^2}-r_{22}E_y\right)x^2+\left(\frac{1}{n_o^2}+r_{22}E_y\right)y^2+\left(\frac{1}{n_e^2}\right)z^2+2yzr_{51}E_y=1.$$

The new index ellipsoid has a major axis rotated from the original axis and the length of the axis, which corresponds to the indices of refraction, may be modified such that the new equation of the ellipsoid contains no mixed terms and is of the form $$\frac{x'^2}{n_x'^2}+\frac{y'^2}{n_y'^2}+\frac{z'^2}{n_z'^2}=1$$

The new indices of refraction may be found by solving the eigenvalue problem $$\begin{pmatrix}\frac{1}{n_o^2}-r_{22}E_y & 0 & 0 \\ 0 & \frac{1}{n_o^2}+r_{22}E_y & r_{51}E_y \\ 0 & r_{51}E_y & \frac{1}{n_o^2}\end{pmatrix}V=\frac{1}{n'^2}V.$$

The eigenvectors V are the new principal exes and the eigenvalues, n' are new indices of refraction. A solution for the eigenvalues results in the following mathematical representation:

$$n_x'=n_e+\frac{1}{2}n_o^3r_{22}E_y$$

$$n_y'=n_e-\frac{1}{2}n_o^3r_{22}E_y$$

$$n_z'=n_e.$$

The new eigenvectors may have their axis rotated about the x-axis by the angle $$\tan(2\theta)=\frac{2r_{51}E_y}{\frac{1}{n_e^2}-\frac{1}{n_e^2}}.$$

For a crystal with the y-axis normal to the crystal face and an electric field applied along the y-axis the birefringence may be represented as:

$$\Delta n=n_z'-n_x'=n_e-n_o-\frac{1}{2}n_o^3r_{22}E_y.$$

In order for the filter to be fully tunable, a phase shift change of $2\pi$ is typically required. However, in a wide field configuration, each half only needs to provide half the phase shift or $\Delta\Gamma=\pi$. In the case of a bipolar voltage source, the required peak voltage may be reduced by a further factor of 2. Using the equations above $$\Delta\Gamma = \pm\frac{\pi}{2} = \frac{2\pi}{\lambda}d\frac{1}{2}n_o^3 r_{22}E_y$$

or in terms of voltage, $$V = \pm\frac{\lambda}{2n_o^3 r_{22}}.$$

Using $r_{22}=6.8\times10^{-12}$, $\lambda=660$ nm, and $n^o=2.278$ the required voltage is calculated as being about 4.11 kV. This is independent of the crystal thickness, but may be proportional to the wavelength. At shorter wavelength, such as 532 nm the voltage may be reduced to about 3 kV. In addition to the change of phase, the applied voltage may cause a slight rotation of the principal axes. This may be estimated using $r_{51}=32\times10^{-12}$, d=10 mm, and V=4 kV, as a rotation angle of about ~0.05°, which is negligible.

What is claimed is:

1. An electrically tunable optical filter, comprising:
   a first filter element comprising:
   a first planar, singular solid crystal comprised of a material that exhibits birefringence and is electro-optically active and having a first and second surface and a first crystal thickness;
   a first substantially transparent electrode adjacent to said first surface and a second substantially transparent electrode adjacent to said second surface;
   a first polarizer located substantially proximate to said first surface and having a first axis of polarization oriented at 45 degrees to an optical axis of said crystal; and
   a second polarizer located substantially proximate to said second surface and having a second axis of polarization oriented at 45 degrees to said optical axis of said crystal and either parallel or perpendicular to said first axis of polarization;
   wherein the first crystal is comprised of lithium niobate; and
   wherein a crystalline structure of said first crystal is oriented such that when a voltage is applied parallel to the direction of light between said first and second electrodes, the retardation of said first crystal changes thereby altering the spectral transmission of said optical filter.

2. The tunable optical filter of claim 1 wherein said first filter element further comprises a half-wave plate substantially adjacent to said second surface and having an optical axis parallel or perpendicular to said first axis of polarization; a second planar, solid crystal comprised of said material and having a first and a second surface and a second crystal thickness and having a second optical axis oriented at 90 degrees to said optical axis of said first crystal; and
   wherein said a second polarizer located substantially proximate to said second surface of said second crystal.

3. The tunable optical filter of claim 2 wherein said first filter element further comprises a third substantially transparent electrode adjacent to said first surface of said second crystal and a second substantially transparent electrode adjacent to said second surface of said second crystal, and wherein a crystalline structure of said second crystal is oriented such that when a voltage is applied between said third and forth electrodes, the retardation of said second crystal changes thereby altering the spectral transmission of said optical filter.

4. The tunable optical filter of claim 3 wherein said first solid crystal is comprised of a first element having a first thickness and a second element having a second thickness different from said first thickness and wherein an optical axis of said first element is oriented at 90 to an optical axis of said second element, such that said first crystal has an effective retardation equivalent to a crystal of said material having a thickness equal to the difference between said first thickness and said second thickness.

5. The tunable optical filter of claim 4 wherein said second solid crystal is comprised of a first element having a first thickness and a second element having a second thickness different from said first thickness and wherein an optical axis of said first element is oriented at 90 to an optical axis of said second element, such that said second crystal has an effective retardation equivalent to a crystal of said material having a thickness equal to the difference between said first thickness and said second thickness.

6. The tunable optical filter of claim 5 further comprising a second filter element comprising all the elements of said first filter element and wherein an effective retardation of a first crystal of said second filter element is substantially half said effective retardation of said first crystal in said first filter element and an effective retardation of the second crystal in said second filter element is substantially half said effective retardation of said second crystal in said first filter element, thereby creating an electrically tunable Lyot filter.

7. The tunable optical filter of claim 4 further comprising a second filter element comprising all the elements of said first filter element and wherein an effective retardation of a first crystal of said second filter element is substantially half said effective retardation of said first crystal in said first filter element and a thickness of the second crystal in said second filter element is substantially half said second crystal thickness in said first filter element, thereby creating an electrically tunable Lyot filter.

8. The tunable optical filter of claim 2 further comprising a second filter element comprising all the elements of said first filter element and wherein a thickness of the first crystal in said second filter element is substantially half said first crystal thickness in said first filter element and a thickness of the second crystal in said second filter element is substantially half said second crystal thickness in said first filter element, thereby creating an electrically tunable Lyot filter.

9. The tunable optical filter of claim 1 further comprising a second filter element comprising all the elements of said first filter element and wherein a thickness of the first crystal in said second filter element is substantially half said first crystal thickness in said first filter element, thereby creating an electrically tunable Lyot filter.

10. The tunable optical filter of claim 1 further comprising a fiber optic taper comprised of a bundle of two or more tapered optical fibers, and wherein an optical axis of said fiber optic taper is aligned substantially parallel to an optical axis of said optical filter.

11. The tunable optical filter of claim 10 wherein a larger end of said fiber optic taper is positioned to substantially confronts said first surface of said first filter element.

12. The tunable optical filter of claim 11 where said first filter element is the input element.

13. A method of electrically tuning an optical filter, comprising:
   providing a first filter element comprising:
   a first planar, singular solid crystal comprised of a material that exhibits birefringence and is electro-optically active and having a first and second surface and a first crystal thickness, the first crystal comprising lithium niobate;
   a first substantially transparent electrode adjacent to said first surface and a second substantially transparent electrode adjacent to said second surface;

a first polarizer located substantially proximate to said first surface and having a first axis of polarization oriented at 45 degrees to an optical axis of said crystal; and a second polarizer located substantially proximate to said second surface and having a second axis of polarization oriented at 45 degrees to said optical axis of said crystal and either parallel or perpendicular to said first axis of polarization;

orienting a crystalline structure of said first crystal; and applying a voltage between said first and second electrodes parallel to the direction of light, thereby altering the retardation of said first crystal thereby altering the spectral transmission of said optical filter.

* * * * *

UNITED STATES PATENT AND TRADEMARK OFFICE
CERTIFICATE OF CORRECTION

PATENT NO. : 8,107,152 B2
APPLICATION NO. : 12/201614
DATED : January 31, 2012
INVENTOR(S) : Levinton It is certified that error appears in the above-identified patent and that said Letters Patent is hereby corrected as shown below:

At column 2, line 24, "Δ.n" should be "Δn"

At column 3, line 19, delete "adding"

At column 4, line 63, "\but" should be "but"

At column 4, line 64, "tantalite" should be "tantalate"

At column 5, line 4, "LiBNbO3" should be "LiNbO$_3$"

At column 5, line 23, "LiBNbO3" should be "LiNbO$_3$"

At column 9, line 35, "tantalite" should be "tantalate"

At column 10 lines 30-35 equation, in third row, third column in matrix is $\frac{1}{n_o^2}$ .... should be $\frac{1}{n_e^2}$ At column 10, lines 42-48 in first equation;

$n'_x = n_e + \frac{1}{2}n_o^3 r_{2_2} E_y$ should be $n'_x = n_o + \frac{1}{2}n_o^3 r_{2_2} E_y$ M column 10, lines 42-48, in second equation;

$n'_y = n_e + \frac{1}{2}n_o^3 r_{2_2} E_y$ should be $n'_y = n_o + \frac{1}{2}n_o^3 r_{2_2} E_y$ Signed and Sealed this
Third Day of April, 2012

David J. Kappos
*Director of the United States Patent and Trademark Office*

Column 10 lines 51-55, $\tan(2\theta) = \dfrac{2r_{s1}E_y}{\dfrac{1}{n_e^2}-\dfrac{1}{n_e^2}}$ should be $\tan(2\theta) = \dfrac{2r_{s1}E_y}{\dfrac{1}{n_o^2}-\dfrac{1}{n_e^2}}$ Column 11 line 14: "$n^0$" should be "$n_0$"